Feb. 24, 1948.   G. KENDE ET AL   2,436,576
MOUNT FOR BINOCULARS
Filed Feb. 14, 1945   3 Sheets-Sheet 3
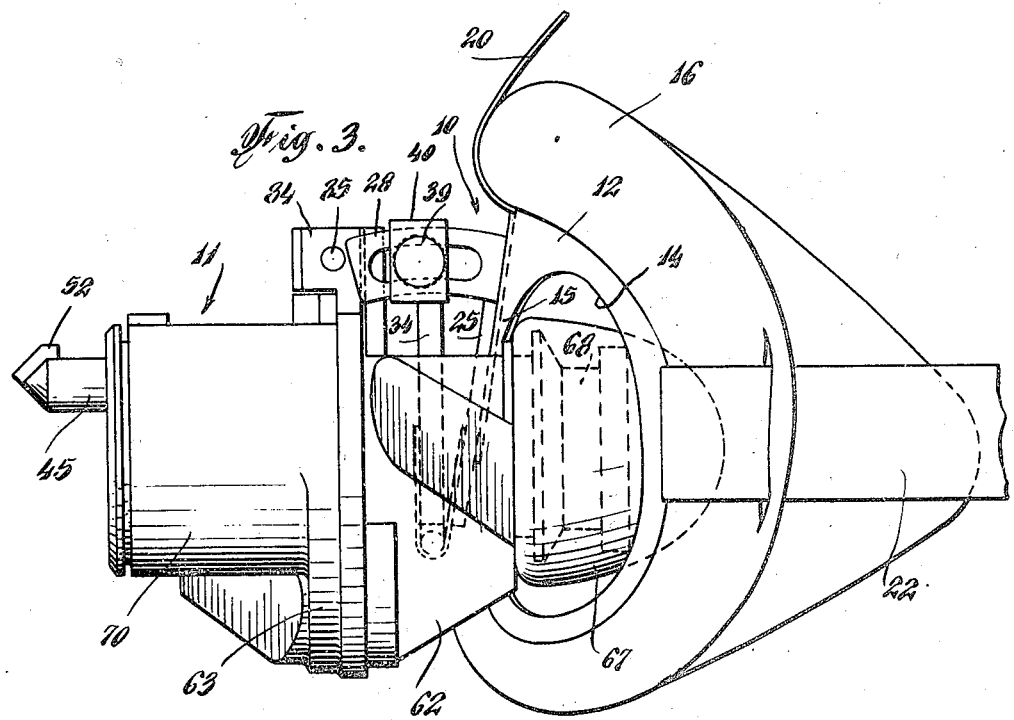
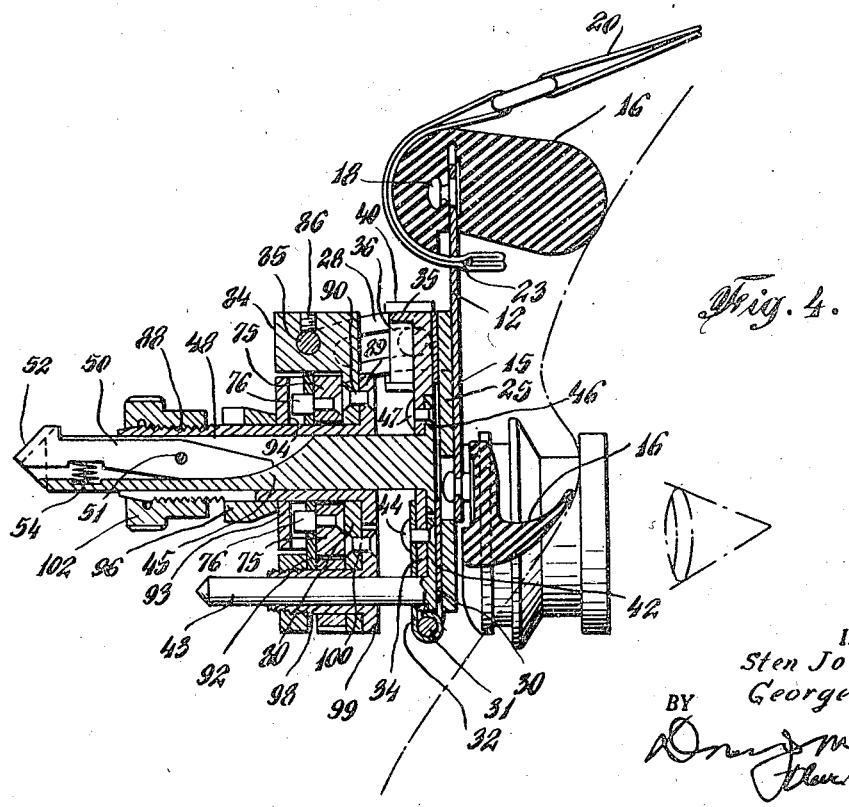
INVENTORS.
Sten Johanson
George Kende
BY
ATTORNEY.

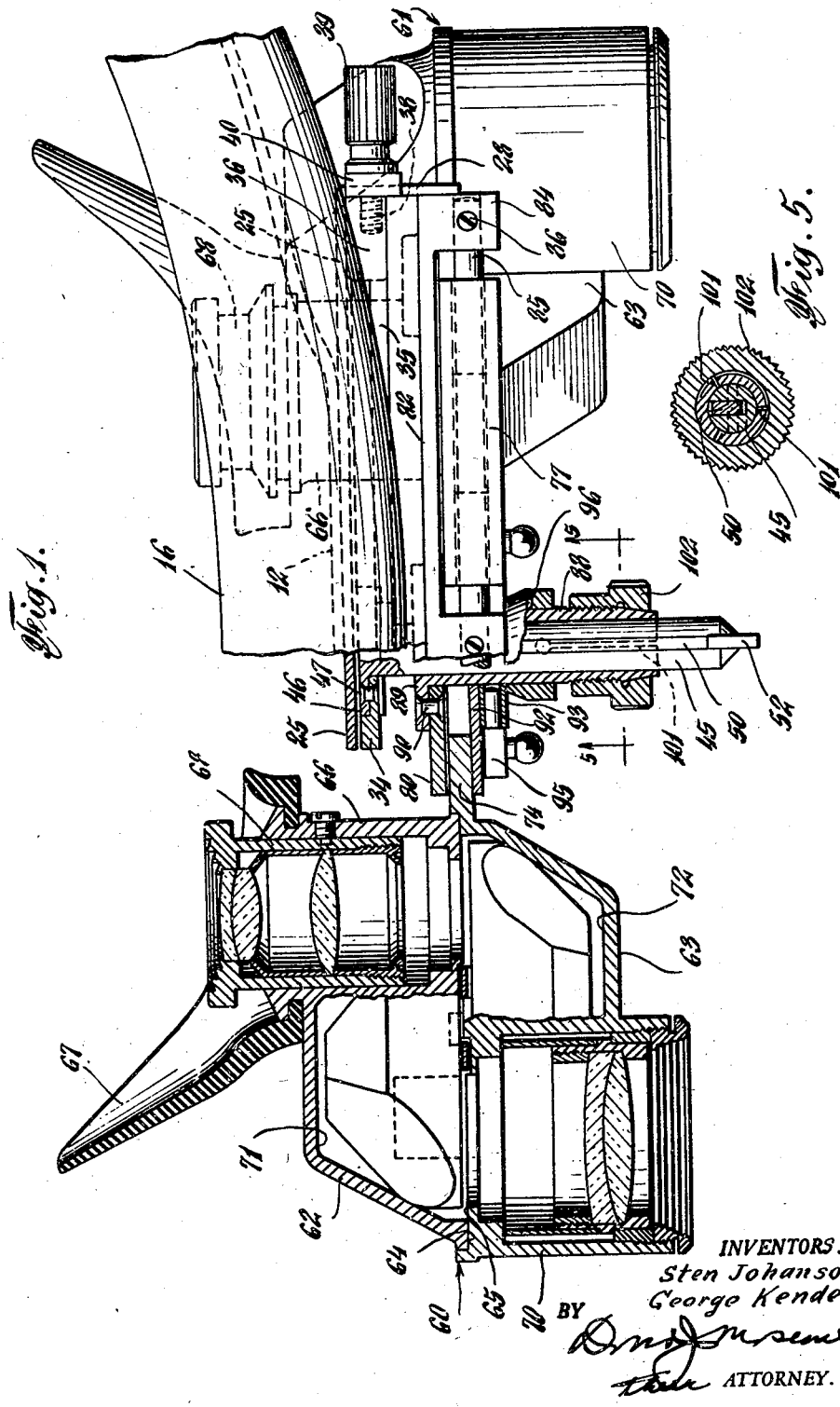

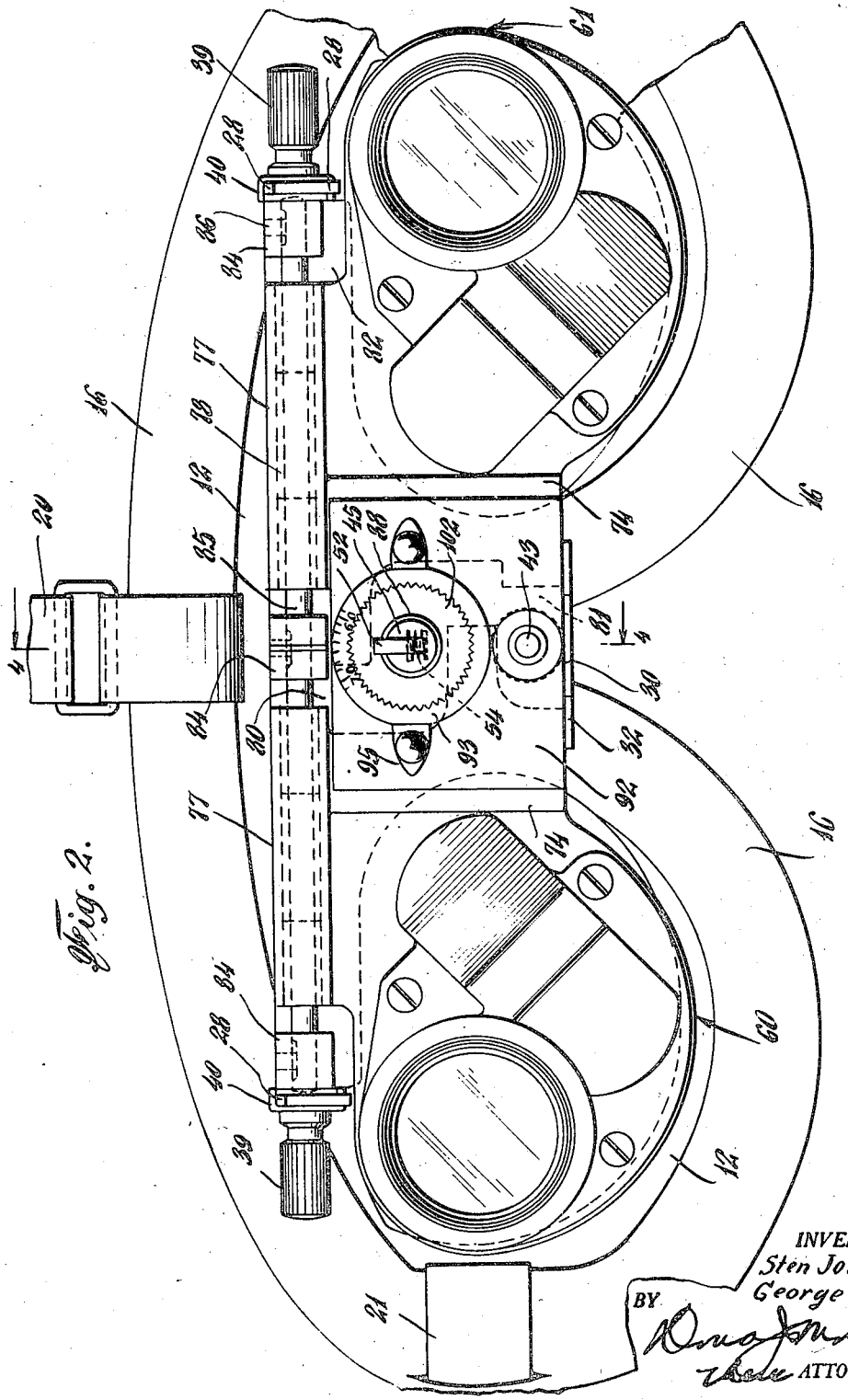

Patented Feb. 24, 1948

2,436,576

UNITED STATES PATENT OFFICE 2,436,576

MOUNT FOR BINOCULARS

George Kende, Dobbs Ferry, and Sten Johanson, New York, N. Y., assignors to Universal Camera Corporation, New York, N. Y., a corporation of New York Application February 14, 1945, Serial No. 577,875

5 Claims. (Cl. 88—36)

This invention relates to optical instruments, and means for mounting and adjustably supporting the same in operative position before the eyes of the user.

It is therefore the general object of the invention to provide a novel and improved structure in the nature of a headgear whereby a comparatively powerful binocular may be comfortably supported in operative position without the use of additional supporting members associated with the torso or other parts of the user's body and readily adjusted in use for proper operation while being easily assembled with the headgear and removed therefrom whenever desired.

More specifically, it is an object of the invention to provide a structure whereby the inclination of the binocular relative to the supporting headgear may be varied to insure proper positioning of the binocular irrespective of the variations in shape of the head of the user, the distance of the binocular relative to the eyes adjusted as desired and the interocular adjustment of the binocular effected, all of said adjustments being readily and expeditiously obtainable while the instrument is in use.

Another object is to provide a headgear comprising a tiltable element carrying supporting and locating studs for the binocular and means associated with said tiltable element for locking the same in adjusted position.

A further object is to provide means for slidably mounting the binocular upon the supporting studs aforementioned, to permit ready removal of the binocular from the headgear, and means for locking the instrument in any desired position longitudinally of the studs.

Still another object is to provide safety means associated with one of the supporting studs for preventing accidental separation of the binocular from the headgear.

These and other related objects will become apparent in the following description of a preferred embodiment of the invention illustrated in the drawings, wherein:

Fig. 1 is a top plan view of an assembled binocular and headgear according to the invention, partly in horizontal section to illustrate the structure of the binocular and of the means for mounting and adjustably supporting the same.

Fig. 2 is a front elevational view of the assembled binocular and headgear.

Fig. 3 is a side elevatonal view of the instrument of Fig. 2, illustrating the tilting adjustment of the binocular.

Fig. 4 is a transverse vertical section through the assembled binocular and headgear on line 4—4 of Fig. 2.

Fig. 5 is a vertical section on line 5—5 of Fig. 1.

Referring now in detail to the drawings and in the first place particularly to Figs. 2 and 3, numeral 10 indicates the headgear or mounting of the binocular as a whole, and 11 generally designates the binocular. The headgear that will now be described, comprises a metal frame 12 formed with substantially oval eye apertures 14 separated by a central frame portion 15, said frame being provided with a peripheral cushioning pad 16 of sponge rubber or the like, suitably secure thereto as in the manner shown at 18 in Fig. 4. The whole is substantially in the form of a pair of goggles adapted to be carried in proper position before the user's eyes by means of suitable head straps, such as the elastic adjustable top strap 20 and side straps 21, 22 suitably secured to the frame 12, as shown at 23 in Fig. 4.

The frame carries a rigid metal plate 25, fastened thereto in any suitable manner, which extends downwardly between the eye apertures 14 in juxtaposition to the central frame portion 15 and has its upper portion enlarged to extend laterally in opposite directions substantially above the eye apertures. The ends of said upper portion of the plate 25 are provided with slotted segments 28 preferably formed integral therewith and extending outwardly at a right angle thereto (see Figs. 1, 3 and 4).

Fastened to the lower end of the plate 25 is a hinge member 30 pivotally connected, as at 31, to a further hinge member 32, which in turn is secured to the lower end of a further plate 34 to connect this latter to the plate 25 for angular movement relative thereto. The plate 34 is substantially identical in contour to the plate 25. Its upper portion embodies a longitudinal reinforcing rib 35, and is thickened at its opposite ends to form elements 36 adjacent the inner faces of the slotted segments 28 of the plate 25. Said elements are provided with threaded holes adapted to receive screws 38 which pass through the slotted segments 28 and have heads or knobs 39 projecting outwardly from the segments and adapted to clamp washers 40 to the outer face of the segments so as to lock the plate 34 in any desired angular position relative to the plate 25. Right hand and left hand threads are used for the screws 38 to permit locking or unlocking of the plate 34 by simultaneously rotating both knobs 39 in the same direction.

The face of the plate 34 opposed to the plate 25 is recessed to receive the flange or head 42 of a stud 43 passing through the plate and associated hinge member 32, suitably arranged rivets 44 (one of which is shown in Fig. 4) being provided for rigidly connecting the stud head with the plate and hinge member aforesaid.

Above and in alinement with the stud 43, the plate 34 carries a second parallel large stud 45, which likewise projects from the plate and has a head 46 received within a recess in the rear face of the plate and rigidly secured thereto as by means of rivets 47 (Figs. 1 and 4).

The stud 45 is longitudinally grooved, as at 48, to accommodate a key 50 which is pivotally secured therein, as shown at 51, and has its forward end formed with a hook-shaped portion 52 which is normally maintained by the spring 54 in a position wherein it projects upwardly from the stud for the purpose that will become hereafter apparent.

The studs 43 and 45 are intended to locate and carry the binocular 11 constructed in the manner that will now be described.

The binocular comprises a pair of housings 60, 61 for the optical systems thereof, each consisting of matable eye piece and objective sections 62, 63, preferably made of light metal castings, which have one open end and are suitably joined together along their respective flat faces 64, 65.

The section 62 embodies an integral cylindrical open-ended portion 66 mounting a rubber eye cap 67 and carrying an eye piece 68, which is rotatable and axially displaceable therein to permit focusing adjustment, and is provided with a suitable system of lenses. Likewise, the section 63 comprises an integral open-ended cylindrical portion 70 incorporating suitable objective lenses. The two sections embody portions 71 and 72 defining opportunely disposed cavities for the prisms of the optical system of the housing maintained therein in adjusted position in any suitable manner.

Each objective section 63 has an integral laterally projecting portion 74 terminating in an extension 75, which carries a projecting pin 76 (see Fig. 4), and is also provided with a thickened portion 77 extending along its upper side outwardly of the housing formed by the joined objective and eye piece sections. Said portion or extension 77 is longitudinally bored and provided with a bushing 78.

A rigid plate 80, mounted on the studs 43 and 45 as hereinafter described has a reduced lower portion 81 extending between the housings 60, 61 (as indicated in dotted lines in Fig. 2) and an enlarged upper portion 82 provided with three integral spaced supports 84 for a shaft 85 which extends through the supports and secured therein by means of set screws 86. The aforementioned portions 77 of the objective sections are mounted on the shaft 85 for sliding movement thereon between pairs of supports 84, the projecting portions 74 of the objective sections and their extensions 75 being juxtaposed to the lower portion 81 of the plate 80.

A hollow stud or sleeve 88 having a flange portion or head 89 fastened to the rear face of the plate 80 by means of rivets 90, projects from said plate, centrally of the lower portion 81 thereof and is adapted to receive the aforementioned stud 45.

A second plate 92 is mounted on the sleeve 88 in juxtaposed relation to the portions 74 of the objective sections and their extensions 75, and is slotted to permit passage of the pins 76. A disc 93, rotatably mounted on the sleeve 88, is juxtaposed to the plate 92 and is provided in its rear face with alined radially extending grooves 94 adapted to slidably receive the pins 76. The disc is also bored to receive one end of projecting operating handles 95. The structure is completed by a knob 96 mounted on the sleeve 88 in juxtaposition to the disc 93 to maintain the elements described in assembled relation, the disc being adjusted and suitably locked in the position required for preventing objectionable play between the associated elements while permitting relative movement thereof.

The rotation of the disc 93 in opposite directions and the consequent angular displacement of the grooves 94 with which the pins 76 are associated, result in a translatory movement of the pins and therefore of the housings 60, 61 (through the extensions 75 and the portions 74 of the objective sections of the housings), away from or towards one another, so that the rotation of the disc is effective to bring about any desired interocular adjustment of the instrument within the limits allowed by the dimensions and arrangement of the associated structural elements.

The structure and the operation of the binocular heretofore described are substantially identical to those disclosed in greater detail in my co-pending application Serial No. 577,874, filed February 14, 1945, to which reference is herein expressly made.

In addition to the elements hereinbefore described, there is provided a sleeve or bushing 98 having a flange 99 secured to the rear face of the binocular plate 80, as by means of rivets 100; said sleeve projects from the plate, underneath and in alinement with the sleeve 88, to slidably receive the stud 43 projecting from the plate 34 of the mounting. Furthermore, the sleeve 88, which slidably receives the stud 45, has its free end longitudinally split as indicated at 101 (see Figs. 1 and 5) and carries a knurled knob 102 threadedly mounted thereon and operable to press said split end into frictional engagement with the surface of the stud 45 to permit locking of the sleeve thereon.

As will be apparent from the foregoing, the binocular may be readily assembled with the headgear by sliding the sleeves 88 and 98 over the supporting and locating studs 45 and 43, the hook-shaped end portion 52 of the spring-loaded key 50 then forming a safety catch preventing accidental separation of the sleeve 88 from its stud. Manifestly, to remove the binocular from the headgear it will be sufficient to press down theaforementioned end portion 52 of the key and slide the sleeves off the studs.

The binocular can be longitudinally adjusted on the studs to insure proper positioning of the eye pieces relative to the eyes of the observer wearing the headgear (eye distance adjustment) and locked in said adjusted position merely by tightening the knob 102. The interocular adjustment may be effected with the binocular on or off the headgear merely by rotating the disc 93.

The angular relation of the binocular to the headgear may be varied whenever required to insure level position of the binocular, by tilting the plate 34, which carries the binocular supporting studs and is hinged to the plate 25 fastened to the goggle frame, as described.

This tilting adjustment may be likewise effected with great ease simply by simultaneously turning the locking knobs 39 in one direction to loosen said knobs, thereby permitting angular movement of the plate 34 to the desired position, and subsequently turning the knobs in the opposite direction to securely tighten the same.

While the invention has been described substantially with reference to a specific embodiment thereof, it will be understood that changes and modifications may be made in the structure described and illustrated without departing from the spirit of the invention or exceeding the scope of the claims.

We claim:

1. In a device for supporting a binocular before the eyes, a headgear comprising a goggle frame, a plate juxtaposed to said goggle frame and hingedly connected to the same for swinging movement in a downward direction to permit angular adjustment relative to the frame, means for locking said plate in angularly adjusted position, a stud carried by the plate and projecting therefrom in a forward direction, a sleeve rigidly secured to the binocular mounted on said stud to support the binocular thereon, said sleeve being slidable along the stud for longitudinal adjustment thereon, and means carried by the sleeve for locking the same on the stud in longitudinally adjusted position.

2. In a device for supporting a binocular before the eyes, a headgear comprising a supporting frame adapted to rest on the face of the wearer, a plate juxtaposed to said frame and tiltably connected to the same for angular adjustment relative thereto, a pair of segments projecting from the frame in a forward direction, means carried by said plate actuable into locking engagement with said segments to lock the plate in angularly adjusted position, a stud carried by the plate and projecting horizontally therefrom, a sleeve rigidly secured to the binocular mounted on said stud to support the binocular thereon, said sleeve being slidable along the stud for longitudinal adjustment thereon, and means for locking the sleeve on the stud in longitudinally adjusted position.

3. In a device for supporting a viewing device before the eyes, a headgear comprising a supporting member having eye apertures adapted to rest on the face of the wearer, a plate having a portion extending in juxtaposition to said supporting member between the eye aperture and hingedly connected at its lower end to the member for angular adjustment relative thereto, means for locking said plate in angularly adjusted position relative to said member, a rigid element carried by said portion of the plate and projecting therefrom in a forward direction, a member rigidly secured to the viewing device mounted on said projecting element to support the viewing device thereon, said member being slidable on the projecting element for longitudinal adjustment thereon, and means for locking the slidable member on the projecting element in longitudinally adjusted position.

4. In a device for supporting a binocular before the eyes, a headgear comprising a supporting member adapted to rest on the face of the wearer, a plate juxtaposhed to said member and tiltably connected to the same for angular adjustment relative thereto, means for locking said plate in angularly adjusted position, a stud carried by the plate and projecting therefrom in a forward direction, a sleeve rigidly secured to the binocular mounted on said stud to support the binocular thereon, said sleeve being slidable on the stud for longitudinal adjustment thereon and having a split end portion, and means carried by the sleeve operable to clamp said split end portion to the stud to lock the sleeve on the stud in longitudinally adjusted position.

5. In a device for supporting a binocular before the eyes, a headgear comprising a supporting member adapted to rest on the face of the wearer, a plate juxtaposed to said member and tiltably connected to the same for angular adjustment relative thereto, means for locking said plate in angularly adjusted position, a stud carried by the plate and projecting therefrom in a forward direction, a sleeve rigidly secured to the binocular mounted on said stud to support the binocular thereon, said sleeve being slidable on the stud for longitudinal adjustment thereon and having a split end portion, means carried by the sleeve operable to clamp said split end portion to the stud to lock the sleeve on the stud in longitudinally adjusted position, and a spring-loaded safety catch at the free end of the stud for preventing separation of the sleeve from the stud.

GEORGE KENDE.
STEN JOHANSON.

REFERENCES CITED

The following references are of record in the file of this patent:

UNITED STATES PATENTS

| Number | Name | Date |
|---|---|---|
| 553,146 | Aitchison | Jan. 14, 1896 |
| 724,197 | Marshutz | Mar. 31, 1903 |
| 1,834,909 | Wilson | Dec. 1, 1931 |
| 1,992,523 | Dupret | Feb. 26, 1935 |
| 1,993,485 | Paul | Mar. 5, 1935 |
| 2,270,931 | Corcoran | Jan. 27, 1942 |
| 2,357,377 | Bausch | Sept. 5, 1944 |

FOREIGN PATENTS

| Number | Country | Date |
|---|---|---|
| 73,246 | Switzerland | Dec. 27, 1915 |